United States Patent [19]

Stepe et al.

[11] Patent Number: 4,991,659
[45] Date of Patent: Feb. 12, 1991

[54] RIPPER ASSEMBLY WITH PITCH CONTROL AND INTEGRAL FRAME AND PUSH BLOCK

[75] Inventors: Visvaldis A. Stepe, East Peoria; Chris E. Akins, Washington, both of Ill.

[73] Assignee: Caterpillar Inc., Peoria, Ill.

[21] Appl. No.: 513,129

[22] Filed: Apr. 23, 1990

[51] Int. Cl.$^5$ .................. A01B 63/10; E02F 5/32
[52] U.S. Cl. .................. 172/464; 172/699; 172/483
[58] Field of Search .............. 172/292, 484, 699, 491, 172/668, 675, 677, 679, 430, 448, 464, 474, 776

[56] References Cited

U.S. PATENT DOCUMENTS

| | | | |
|---|---|---|---|
| 3,116,797 | 1/1964 | Launder et al. | 172/484 |
| 3,503,456 | 3/1970 | Larson | 172/484 |
| 3,539,018 | 11/1970 | Sprenkel | 172/484 |
| 3,752,239 | 8/1973 | Kelley | 172/699 |
| 4,321,970 | 3/1982 | Thigpen | 172/464 |

OTHER PUBLICATIONS

Literature—"The Strongest Pipeline Rippers Made", by Sabine Metal and Machine Company, Cleveland, Tex., Printed: Jan. 19, 1981.

*Primary Examiner*—Randolph A. Reese
*Assistant Examiner*—Spencer Warnick
*Attorney, Agent, or Firm*—J. W. Burrows

[57] ABSTRACT

Ripper assemblies are normally utilized for ripping hardened ground, rock, and so forth. Due to the type of ground being ripped, it is many times advantageous to selectively change the pitch angle of the ripper tip during the ripping operation. Furthermore, it is advantageous to have a push block associated with the ripper assembly in order to allow the second vehicle to provide an additional pushing force for ripping of the ground. When a ripper assembly incorporates an adjustable pitch control and has a push block, the visibility of the ripper tip by the operator is many times limited or totally lost. In this subject arrangement, a push block is integral with a frame assembly and a ripper carriage assembly is pivotally secured to the frame assembly. By the push block being integral with the frame assembly, the ripper carriage assembly is simple and compact allowing better visibility by the operator to the rear of the ripper assembly. Furthermore, a slight opening is defined in the frame assembly immediately in front has a clear visibility of the area around the ripper shank and/or the ripper tip when the ripper tip is not engaged in the ground. The better visibility to the rear of the ripper assembly is enhanced by having first and second pitch control cylinders universally secured to the ripper carriage assembly generally adjacent thereto.

9 Claims, 2 Drawing Sheets

RIPPER ASSEMBLY WITH PITCH CONTROL AND INTEGRAL FRAME AND PUSH BLOCK

TECHNICAL FIELD

This invention relates generally to a ripper assembly and more particularly to a ripper assembly having an integral frame and push block with pitch control of a ripper tip.

BACKGROUND ART

Ripper assemblies are normally used to loosen hardened ground, break up rock formations, and so forth. In order to get the additional force which at times are needed to pull the ripper shank through the ground, another vehicle is utilized to push the ripper assembly. The second vehicle pushes the ripper assembly by abutting against a push block that is a portion of the ripper assembly. Furthermore, when ripping, it is desirable for an operator to be able to change the angle of the ripping tip with respect to the ground. In order to accomplish this, the ripper shank must be pivotally connected with the main frame of the ripper assembly. Consequently, in order to have a push block associated with the ripper assembly while also being able to change the pitch angle of the ripper tip, it has been necessary to have a pin connection between the ripper shank and the main frame of the ripper assembly. This is detrimental since the additional force provided by the second vehicle against the push block of the ripper assembly is being transmitted through the pivot connection and increases the wear of the pivot connection.

An article published by Sabine Metal and Machine Company of Cleveland, Tex., which was published in the Pipeline Digest dated Jan. 19, 1981, teaches a ripper assembly having a ripper shank secured directly to the frame of the ripper assembly. In this arrangement, the pitch angle of the ripper shank cannot be changed.

U.S. Pat. No. 3,503,456, which issued Mar. 31, 1970 to D. J. Larson and U.S. Pat. No. 4,321,970, which issued Mar. 30, 1982, to James L. Thigpen, each teach a ripper assembly having a push block associated therewith and a pitch angle adjustment for the ripper tip. In each of these arrangements, the push block and ripper assembly are pivotally connected to the main frame of the ripper assembly. Consequently, the forces from a vehicle pushing against the push block is transmitted through the pivotal connection.

U.S. Pat. No. 3,116,797, which issued Jan. 7, 1964, to R. L. Launder et al. and U.S. Pat. No. 3,752,239, which issued Aug. 16, 1973, to Leon O. Kelley, each teach a ripper assembly having a push block integrally formed with the main frame of the ripper assembly and a ripper shank that is adjustable relative to the main frame. However, in each of these arrangements, the frame assembly and the integrally formed push block do not allow adequate visibility by the operator of the ripper tip.

The present invention is directed to overcoming one or more of the problems as set forth above.

DISCLOSURE OF THE INVENTION

In one aspect of the present invention, a ripper assembly adaptable for mounting on a vehicle is provided. The ripper assembly includes a frame assembly having first and second mounting brackets, first and second lift brackets, and an integrally constructed push block. Each of the first and second mounting brackets being spaced from one another and adapted for pivotal connection with the vehicle. The ripper assembly also includes a ripper carriage assembly adapted to receive a ripper shank. The ripper carriage assembly is pivotally secured to the ripper frame assembly at a point of connection located between the push block and the first and second lift brackets. A lift mechanism is provided in the ripper assembly and is connected to the first and second lift brackets of the frame assembly. The first and second lift brackets are located between the ripper carriage connection point therewith and the first and second mounting brackets. The lift mechanism is adaptable for connection to the vehicle and is operative to raise and lower the ripper carriage assembly. The ripper assembly further includes a pitch control mechanism connected to the ripper carriage assembly above the connection point of the ripper carriage assembly with the frame assembly and is adaptable for connection to the vehicle. The pitch control mechanism is operative to pivot the ripper carriage assembly relative to the frame assembly about the pivotal connection thereof. A sight opening is defined in the frame assembly adjacent the ripper carriage assembly. The sight opening is located in the frame assembly between the ripper carriage assembly and the first and second mounting brackets and is of a size sufficient to provide clear visibility therethrough to the ripper shank and/or the ripper tip.

The present invention provides a ripper assembly that has a push block integral with the frame assembly and a ripper carriage assembly that is pivotally connected to the frame. The relationship of the pitch control mechanism and the construction of the frame provides good visibility by the operator of the ripper tip during raising and lowering thereof. By having the push block integral with the frame, there are no pivot joints within the frame that are subjected to extreme wear due to forces being applied to the push block by a separate vehicle assisting the ripping operation.

BEST MODE FOR CARRYING OUT THE INVENTION

Figure 1:
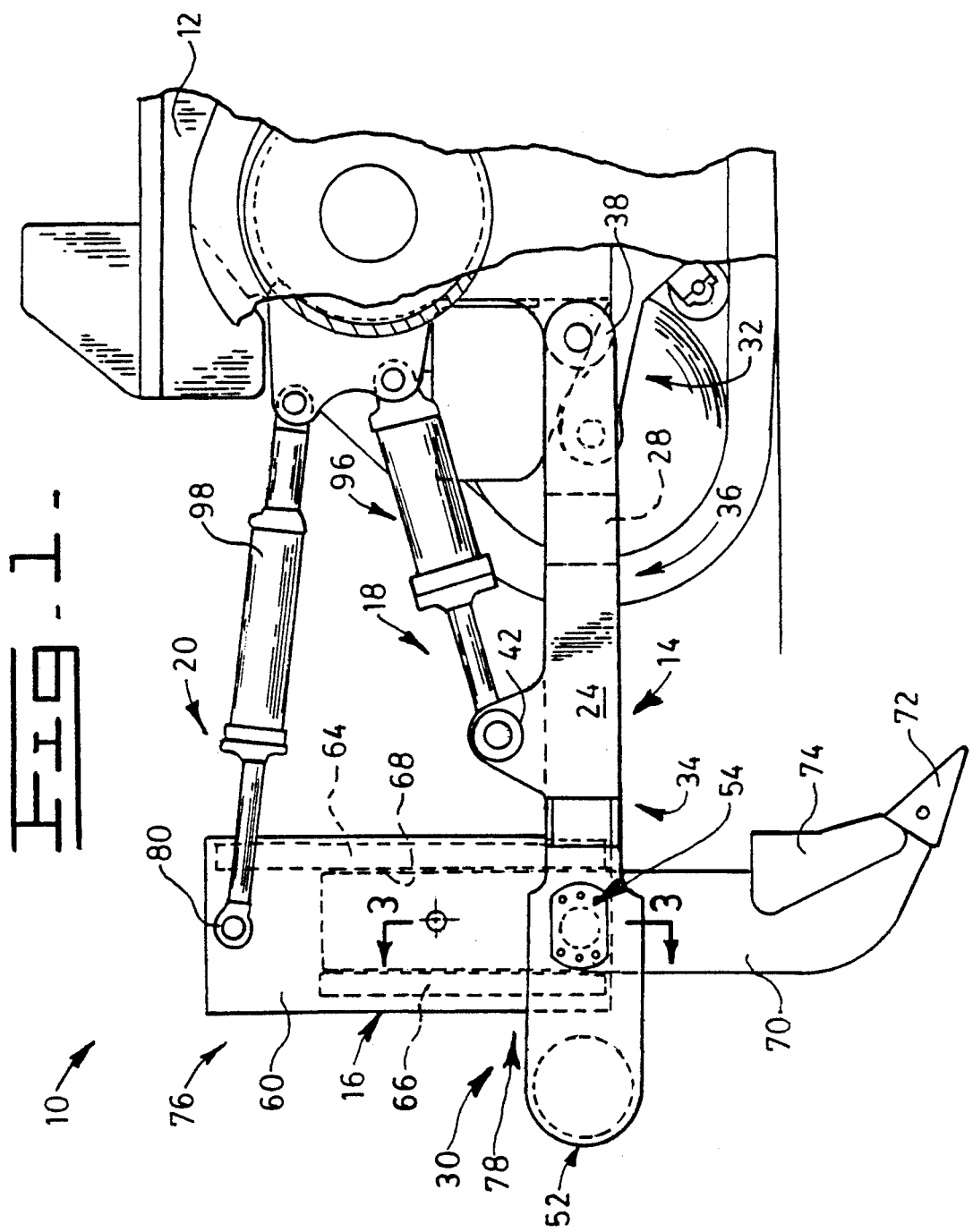
FIG. 1 is a diagrammatic representation of a side view of a ripper incorporating an embodiment of the present invention.
Figure 2:
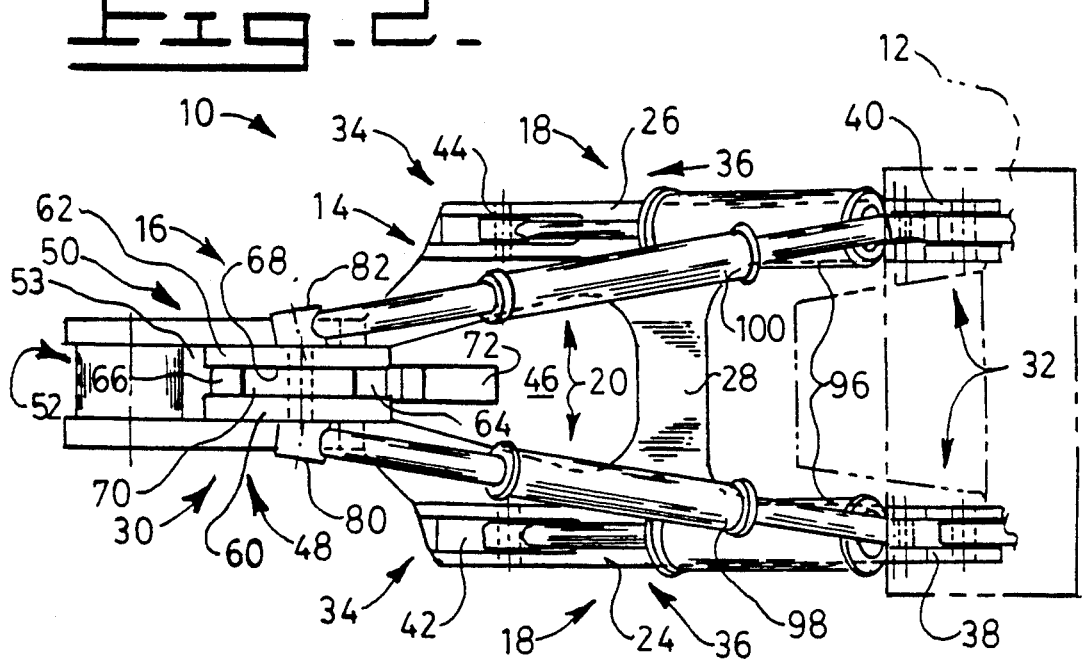
FIG. 2 is a diagrammatic representation of a top view of the ripper assembly illustrated in FIG. 1.

Referring to the drawings, a ripper assembly 10 is shown attached to a vehicle 12. The ripper assembly 10 includes a frame assembly 14, a ripper carriage assembly 16, a lift mechanism 18, and a pitch control mechanism 20.

The frame assembly 14 includes first and second spaced apart beams 24,26, a transverse cross beam 28 connected between the first and second spaced apart beams 24,26, and a rear frame subassembly 30. Each of the first and second spaced apart beams 24,26 have a first end portion 32, a second end portion 34, and an intermediate portion 36. A first mounting bracket 38 is disposed on the first end portion 32 of the first spaced apart beam 24 and a second mounting bracket 40 is disposed on the first end portion 32 of the second spaced apart beam 26. Each of the first and second mounting brackets 38,40 is adapted for pivotal connection with the vehicle 12. The mounting brackets 38,40 could be a pin connection, a ball joint, or other known forms of pivotal connectors.

The transverse cross beam 28 is connected to the intermediate portion 36 of each of the first and second spaced apart beams 24,26. A first lift bracket 42 is disposed on the second end portion 34 of the first spaced apart beam 24 and a second lift bracket 44 is disposed on the second end portion 34 of the second spaced apart beam 26. The rear frame subassembly 30 is connected to the second end portion 34 of each of the first and second spaced apart beams 24,26. An opening 46 is defined in the frame assembly 10 by the rear frame subassembly 30, the transverse cross beam 28, and the second end portion 34 of each of the first and second spaced apart beams 24,26. The opening 46 is of a size sufficient to provide clear visibility therethrough.

The rear frame subassembly 30 includes first and second side portions 48,50 and a push block 52 integrally constructed with the first and second side portions 48,50 at one end thereof. An opening 53 is defined in the rear frame subassembly 30 by the push block 52 and the first and second side portions 48,50. A point of connection 54 is located on the frame assembly 14 between the push block 52 and the first and second lift brackets 42,44. The connection point 54 includes a first pin opening 55 defined in the first side portion 48 and a second pin opening 56 defined in the second side portion 50. The first and second pin openings 55,56 are in axial alignment with each other.

The ripper carriage assembly 16 is connected to the frame assembly 14 at the connection point 54. The ripper carriage assembly 16 includes first and second laterally spaced sides 60,62 and front and rear blocks 64,66 secured to and in spaced relation from each other between the first and second laterally spaced sides 60,62. The first and second laterally spaced sides 60,62 and the front and rear block 64,66 define an opening 68 adapted to receive a ripper shank 70. The ripper shank 70, in a conventional manner, has a ripper tip 72 and a shank protector 74. A pin 75 secures, in a conventional manner, the ripper shank 70 within the opening 68 of the ripper carriage assembly 16.

The first and second sides 60,62 of the ripper carriage assembly 16 each have a top portion 76 and a bottom portion 78. A first universal connection 80 is disposed on the top portion 76 of the first side 60 and adjacent thereto and a second universal connection 82 is disposed on the top portion 76 of the second side 62 and adjacent thereto. A first pin opening 84 is defined in the bottom portion 78 of the first side 60 and a second pin opening 86 is defined in the bottom portion 78 of the second side 62. The first and second pin openings 84,86 of the respective first and second sides 60,62 are in axial alignment with each other.

The ripper carriage assembly 16 is disposed in the opening 53 of the rear frame subassembly 30. A first bearing 88 is located at the connection point 54 between the first side 60 of the ripper carriage assembly 16 and the first side portion 48 of the rear frame subassembly 30. A second bearing 90 is located at the connection point 54 between the second side 62 of the ripper carriage assembly 16 and the second side portion 50 of the rear frame subassembly 30. A first pin 92 is disposed in the first pin opening 84 of the first side 60 of the ripper carriage assembly 16 and the first pin opening 55 of the first side portion 48 of the rear frame subassembly 30. A second pin 94 is disposed in the second pin opening 86 of the second side 62 of the ripper carriage assembly 16 and the second pin opening 56 of the second side portion 50 of the rear frame subassembly 30. The first and second pins 92,94 are operative to permit the ripper carriage assembly 16 to rotate at the connection point 54 relative to the rear frame subassembly 30. The relative rotation between the two assemblies allows the pitch angle of the ripper tip 72 to be selectively changed by the operator during use.

The lift mechanism 18 includes a pair of double acting cylinders 96 connected, in a conventional manner, between the vehicle 12 and the respective first and second lift brackets 42,44.

The pitch control mechanism 20 includes a first pitch control cylinder 98 connected between the vehicle 12 and the first universal connections 80 of the top portion 76 of the ripper carriage assembly 16. The pitch control mechanism 20 also includes a second pitch control cylinder 100 connected between the vehicle 12 and the second universal connection 82 of the top portion 76 of the ripper carriage assembly 16. The spacing between the first and second universal connections 80,82 is less than the spacing of the connection between the first and second pitch control cylinders 98,100 to the vehicle 12.

It is recognized that various forms of the frame assembly 14 and the ripper carriage assembly 16 could be utilized without departing from the essence of the invention. For example, the frame assembly 14 could have various components individually forged and then welded to other components to form the total frame assembly. Furthermore, additional components of the frame assembly could be in the form of plates welded together to form various box sections. Then the box sections can be welded together to form the total frame assembly. Additionally, the shape of the sight opening can be varied and still maintain a sufficient size to ensure good visibility by the operator of the area adjacent the shank and the ripper tip.

INDUSTRIAL APPLICABILITY

In the operation of the vehicle 12 with a ripper assembly 10 attached thereto, the pair of lift cylinders 96 provides the needed force for raising and lowering the ripper assembly 10. The first and second pitch control cylinders 98,100 are utilized to change the pitch angle of the ripper carriage assembly 16 and subsequently the ripper tip 72. The conventional ripper shank 70 is secured in the ripper carriage assembly 16 and the ripper tip 72 is forced into the ground in response to the operator selectively extending the pair of lift cylinders 96.

In order to obtain more efficient ripping operations or to rip areas that the vehicle 12 cannot provide sufficient power for, a second vehicle is utilized to push the first vehicle 12 in order to aid in the ripping operation. The second vehicle contacts the push block 52 and exerts an additional force in the same direction as the first vehicle 12. The additional force provided by the second vehicle is directly transmitted to the frame assembly 14. The force provided by the first vehicle and the force provided by the second vehicle are transmitted to the ripper tip 72 through the first and second pins 92,94. By having the push block 52 as an integral part of the frame assembly 14, the ripper carriage assembly 16 is a more compact design which further helps to provide better visibility by the operator to the rear of the ripper assembly 10. The better visibility to the rear of the ripper assembly 10 is further enhanced by having the first and second pitch control cylinders 98,100 secured to the ripper carriage assembly 16 generally adjacent the first and second sides 60,62 thereof. Since the space between the connection of the first and second cylinders 98,100 to the ripper carriage assembly 16 is smaller than the spacing of the connection thereof to the vehicle 12, the operator can more easily see to the rear of the ripper assembly 14.

The sight opening 46 in the frame assembly 14 provides a clear view by the operator of the area around the ripper tip 72 when the ripper tip 72 is being positioned for entry into the ground. The sight opening 46 also allows the operator to ensure that the ripper tip 72 does not hit other objects when it is in a position generally adjacent the top of the ground. Once the ripper tip 72 is submerged in the ground, the operator still has good visibility to the area around the ripper shank 70 so that he can observe any debris or obstacles that may get trapped in front of the ripper shank 70.

Figure 3:
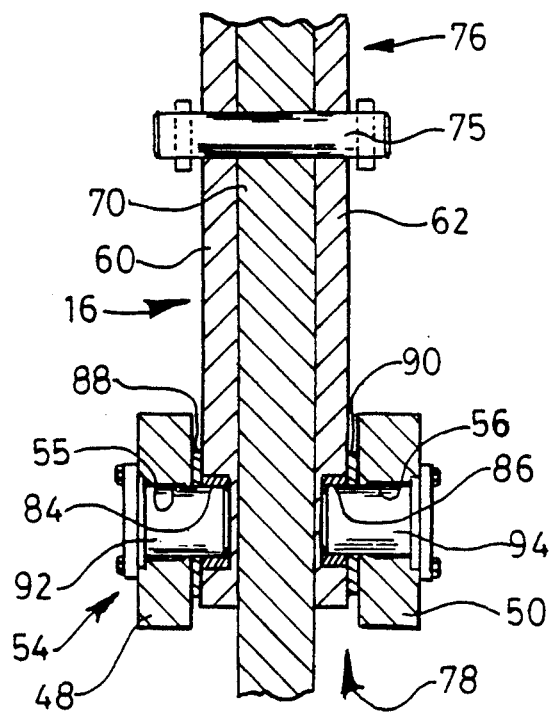
FIG. 3 is a partial cross-sectional view taken from FIG. 1 to better illustrate a portion of the ripper assembly.

As is more clearly shown in FIG. 3, the first and second pins 92,94 provide a simple pivot connection of the carriage assembly 16 with a frame assembly 14. The pivot connection also ensures a strong connection therebetween for transferring the forces from the first vehicle 12 and the second push vehicle to the ripper tip 72 during ripping of the ground.

In view of the foregoing, it is readily apparent that the structure of the present invention provides a ripper frame assembly 10 which has both a simple construction and good operator visibility of the ripper shank 70 and/or the ripper tip 72. Additionally, the structure of the ripper assembly 10 provides better visibility by the operator to the rear of the ripper assembly 10.

Other aspects, objects, and advantages of this invention can be obtained from a study of the drawings, the disclosure, and the appended claims.

We claim:

1. A ripper assembly adaptable for mounting on a vehicle, comprising:
   a one piece frame assembly having first and second mounting brackets, first and second lift brackets, and an integrally constructed push block, each of the first and second mounting brackets, being spaced from one another and adapted for pivotal connection with the vehicle;
   a ripper carriage assembly adapted to receive a ripper shank, the ripper carriage assembly being pivotably secured to the ripper frame assembly at a point of connection between the push block and the first and second lift brackets;
   a lift mechanism connected to the first and second lift brackets of the frame assembly, the first and second lift brackets being at a location on the frame assembly between the ripper carriage assembly connection point and the first and second mounting brackets, the lift mechanism being adapted for connection to the vehicle, and operative to raise and lower the ripper assembly;
   a pitch control mechanism connected to the ripper carriage assembly above the connection point of the ripper carriage assembly with the frame assembly and adapted for connection to the vehicle, said pitch control mechanism being operative to pivot the ripper carriage assembly about the connection point located on the frame assembly; and
   a sight opening is defined in the frame assembly adjacent the ripper carriage assembly, said sight opening is located in the frame assembly between the ripper carriage assembly and the first and second mounting brackets and is of a size sufficient to provide clear visibility therethrough to the area around the ripper shank and/or the ripper tip.

2. The ripper assembly, as set forth in claim 1, wherein the frame assembly has first and second spaced apart longitudinal beams each having a respective one of the first and second mounting brackets located at a first end portion thereof, a transverse cross beam connected between the first and second longitudinal beams at a location spaced from the first and second mounting brackets, and a rear frame sub-assembly connected to a second end portion of the first and second longitudinal beams.

3. The ripper assembly, as set forth in claim 2, wherein the push block is an integral part of the rear frame sub-assembly.

4. The ripper assembly, as set forth in claim 2, wherein the ripper carriage assembly is pivotally disposed in the rear frame sub-assembly between the push block and the second end portion of the first and second longitudinal beams.

5. The ripper assembly, as set forth in claim 4, wherein the sight opening is defined by the ripper carriage assembly, the transverse cross beam, the second end portions of the first and second longitudinal beams, and the interconnection of the first and second longitudinal beams with the rear frame sub-assembly.

6. The ripper assembly, as set forth in claim 1, wherein the ripper carriage assembly has first and second sides with each side having top and bottom portions, and first and second universal connections respectively connected to the top portion of the respective first and second sides, and the pitch control mechanism includes first and second double acting cylinders each respectively connected to the first and second universal connections and each being adapted for connection to the vehicle.

7. The ripper assembly, as set forth in claim 6, wherein the first and second double acting cylinders are connected adjacent the respective first and second sides of the ripper carriage assembly, said first and second universal connections are spaced from one another at a distance less than the space between the connection of the first and second double acting cylinders to the vehicle.

8. The ripper assembly, as set forth in claim 7, wherein the rear frame sub-assembly has first and second side portions and an opening defined by the first and second side portions and the push block to receive the bottom portion of the ripper carriage assembly.

9. The ripper assembly, as set forth in claim 8, wherein each of the first and second side portions of the rear frame sub-assembly defines first and second axially aligned pin openings therein and the bottom portion of each of the first and second sides of the ripper carriage assembly define corresponding first and second axially aligned pin openings therein, a first pin is disposed in the first pin opening of the respective first side portion of the rear frame sub-assembly and the first side of the ripper carriage assembly and a second pin is disposed in the second pin opening of the respective second side portion of the rear frame sub-assembly and the second side of the ripper carriage assembly, the first and second pins disposed in their respective openings provide the pivotal connections point between the ripper carriage assembly and the frame assembly.

* * * * *